J. GUTHRIE.
CLUTCH MECHANISM.
APPLICATION FILED JULY 17, 1915.
1,183,873.
Patented May 23, 1916.
2 SHEETS—SHEET 1.
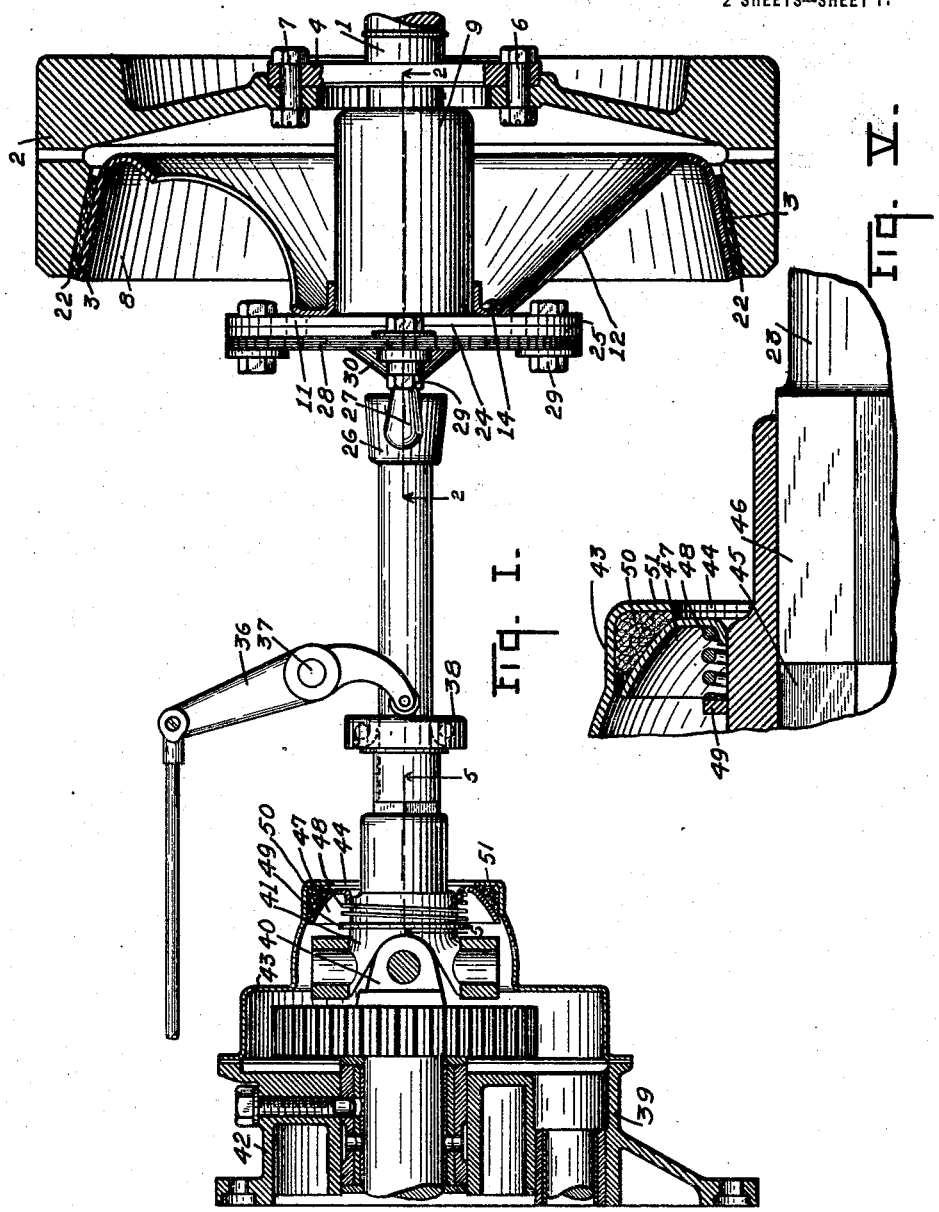
WITNESSES:
B. M. Sanders
L. C. Blake
INVENTOR
James Guthrie
BY
Chappell & Earl
ATTORNEYS

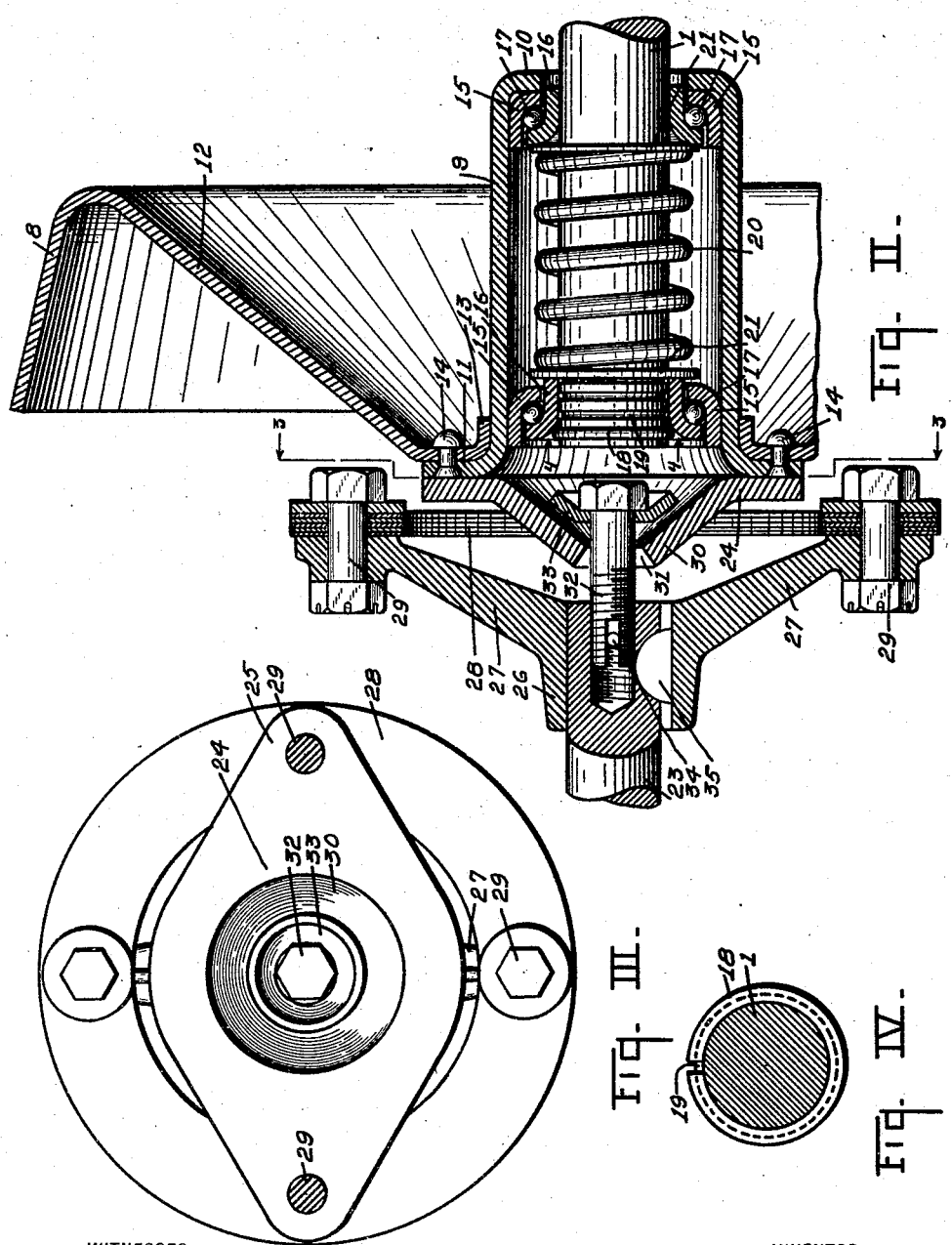

UNITED STATES PATENT OFFICE.

JAMES GUTHRIE, OF JACKSON, MICHIGAN, ASSIGNOR TO BRISCOE MOTOR CO., INC., OF JACKSON, MICHIGAN.

CLUTCH MECHANISM.

1,183,873.  Specification of Letters Patent.  Patented May 23, 1916.

Application filed July 17, 1915. Serial No. 40,403.

*To all whom it may concern:*

Be it known that I, JAMES GUTHRIE, a citizen of the United States, residing at Jackson, Michigan, have invented certain new and useful Improvements in Clutch Mechanisms, of which the following is a specification.

This invention relates to improvements in clutch mechanisms.

My improved clutch mechanism is especially designed by me and I have shown the same embodied in a structure adapted as a transmission for motor vehicles.

The main objects of this invention are to provide an improved clutch transmission structure which is efficient and durable in use and one which is at the same time simple and compact in structure.

Further objects, and objects relating to details and economies of construction and operation, will definitely appear from the detailed description to follow.

I accomplish the objects of my invention by the devices and means described in the following specification.

The invention is clearly defined and pointed out in the claims.

A structure constituting a preferred embodiment of my invention is illustrated in the accompanying drawing forming a part of this specification, in which:

Figure I is a detail side view partially in longitudinal section of a structure embodying the features of my invention. Fig. II is an enlarged detail section on a line corresponding to line 2—2 of Fig. I. Fig. III is a transverse section on a line corresponding to the broken line 3—3 of Fig. II. Fig. IV is a detail transverse section on a line corresponding to line 4—4 of Fig. II, showing means for adjustably supporting the outer driven clutch member bearing upon the driven shaft. Fig. V is an enlarged detail longitudinal section on a line corresponding to line 5—5 of Fig. I.

In the drawing similar reference characters refer to similar parts throughout the several views, and the sectional views are taken looking in the direction of the little arrows at the ends of the section lines.

Referring to the drawing, 1 represents the driving shaft, such as the crank shaft of an engine. In the embodiment illustrated, the driving shaft is provided with a fly wheel 2 provided with a conical clutch member 3. The fly wheel is carried by the spider 4 on the driving shaft, it being secured to the ring of the spider by means of bolts 6 and 7. The driven clutch member 8 is preferably a stamping and is provided with a barrel-like hub 9 having an inturned flange 10 at its inner end and an outturned flange 11 at its outer end.

The web 12 of the driven clutch member is provided with an inturned portion 13 sleeved upon the hub 9 and secured to the flange 11 by the rivets 14. A pair of ball bearings are provided for the driven clutch member, the bearings being adapted to receive the thrust on the clutch. These bearings consist of outer bearing cones 15 fitting within the hub 9 and inner bearing cones 16 on the driving shaft 1, balls 17 being interposed between the cones. The inner bearing is supported axially by the inturned flange 10 of the hub 9. The outer bearing is adjustably supported axially by the retaining ring 18 which is engaged in one of the peripheral grooves 19 on the shaft 1. Between these bearings is a coiled spring 20. Thrust washers or collars 21 are disposed between the ends of the springs and the bearings, as clearly shown in Fig. II. With the spring thus arranged, the outer bearing being fixed with the shaft, the spring tends to hold the driven clutch in engagement with the driving clutch. Suitable facings 22 are provided for the clutch members. The driven clutch is connected to the driven shaft 23 by a universal joint which, in the structure illustrated, consists of the joint member 24 having cross arms 25 and the joint member 26 having cross arms 27. The arms of these joint members are disposed at right angles to each other. They are connected by the intermediate member 28 made up of a plurality of resilient annular pieces and secured to the arms of the joint members by the bolts 29. The joint member 24 is provided with a conical outwardly projecting portion 30 having a central hole 31. A bolt 32 is threaded into the end of the driven shaft 23, the head of the bolt being arranged within this conical part 30 to provide a lost motion connection for the driven shaft to the driven clutch member. A cupped washer 33 is provided for the head of the bolt. A pin 34 prevents the turning of the bolt.

With the parts thus arranged, the driven clutch member is shifted to disengage the clutch by the longitudinal movement of the driven shaft. The lost motion connection permits free movement of the joint as such. The shaft 23 is connected to the joint member 26 by the feather 35. See Fig. II.

The shaft 23 is shifted by means of the lever 36 pivoted at 37 to engage the thrust collar 38 on the shaft. The driven shaft is connected to the transmission, designated generally by the numeral 39, through a universal joint comprising a member 40 and a member 41. The transmission housing or gear case 42 is provided with a housing part 43 embracing this joint. This housing has an opening 44 at its outer end through which the joint member 41 projects. The joint member 41 has a socket 45 adapted to receive the squared end 46 of the driven shaft, providing a slip connection between the driven shaft and the joint.

On the joint member 41 is a spherically curved closure member 47 yieldingly supported by the coiled spring 48, the inner end of which engages the collar 49 on the joint member. A packing 50 is arranged between the closure member and the flange 51 on the housing, thus forming an effective closure for the opening about the shaft member.

My improved transmission mechanism is simple and compact in structure and at the same time is efficient and durable and easy to operate. I have illustrated and described my improvements in a simple and practical embodiment. I have not attempted to illustrate the various modifications in structural details which I contemplate, as I believe the disclosure made will enable those skilled in the art to which my invention relates to embody and adapt the same as may be desired. I desire to be understood, however, as claiming my improvements specifically in the form illustrated as well as broadly within the scope of the appended claims.

Having thus described my invention, what I claim as new and desire to secure by Letters Patent is:

1. The combination of a driving shaft having peripheral grooves at its outer end, a driven shaft, a driving cone clutch member on said driving shaft, a coacting driven cone clutch member provided with a barrel-like hub having an inturned flange at its inner end, a pair of ball bearings, a bearing retaining ring disposed in said grooves in said driving shaft for adjustably supporting the outer bearing, the inner bearing being supported by the flange of said hub, a coiled spring arranged on said driving shaft between said bearings and acting to engage the clutch, a universal joint comprising a pair of cross members secured to said driven shaft and driven clutch member and an annular resilient intermediate member secured to the arms of said cross members, the joint member secured to the driven clutch member being provided with a central outwardly projecting conical portion having a central opening therein, a bolt for shifting said driven clutch member arranged through said opening with its head within said conical portion and threaded into said driven shaft, and means for shifting said driven shaft.

2. The combination of a driving shaft having peripheral grooves at its outer end, a driven shaft, a driving cone clutch member on said driving shaft, a coacting driven cone clutch member provided with a barrel-like hub having an inturned flange at its inner end, a pair of ball bearings, a bearing retaining ring disposed in said grooves in said driving shaft for adjustably supporting the outer bearing, the inner bearing being supported by the flange of said hub, a coiled spring arranged on said driving shaft between said bearings and acting to engage the clutch, a universal joint comprising a pair of cross members secured to said driven shaft and driven clutch member and an annular resilient intermediate member secured to the arms of said cross members, a lost motion clutch shifting connection for said driven shaft to said driven clutch member, and means for shifting said driven shaft.

3. The combination of a driving shaft, a driven shaft, a driving clutch member on said driving shaft, a coacting driven clutch member provided with a hub, a pair of ball bearings disposed within said hub, the outer ball bearing being supported axially by said shaft and the inner by said hub, a coiled spring arranged on said driving shaft between said bearings and acting to engage the clutch, a universal joint comprising a pair of cross members secured to said driven shaft and driven clutch member and an annular resilient intermediate member secured to the arms of said cross members, a lost motion clutch shifting connection for said driven shaft to said driven clutch member, and means for shifting said driven shaft.

4. The combination of a driving shaft, a driven shaft, a driving clutch member on said driving shaft, a coacting driven clutch member provided with a hub, a pair of ball bearings disposed within said hub, the outer ball bearing being supported axially by said shaft and the inner by said hub, a coiled spring arranged on said driving shaft between said bearings and acting to engage the clutch, a universal joint connection for said driven shaft to said driven clutch member, a lost motion clutch shifting connection for said driven shaft to said driven clutch member, and means for shifting said driven shaft.

5. The combination of a driving clutch member, a coacting driven clutch member, a spring arranged to engage said clutch members, a driven shaft, a universal joint comprising a pair of cross members secured to said driven shaft and driven clutch member and an annular resilient intermediate member secured to the arms of said cross members, the joint member secured to the driven clutch member being provided with a central outwardly projecting conical portion having a central opening therein, a bolt for shifting said driven clutch member arranged through said opening with its head within said conical portion and threaded into said driven shaft, and means for shifting said driven shaft.

6. The combination of a driving clutch member, a coacting driven clutch member, a universal joint connection for said driven clutch member and driven shaft, a lost motion clutch shifting connection from said driven shaft to said driven clutch member, and means for shifting said driven shaft.

In witness whereof, I have hereunto set my hand and seal in the presence of two witnesses.

JAMES GUTHRIE. [L. S.]

Witnesses:
H. F. SCHMIDT,
K. R. GRIGSBY.

Copies of this patent may be obtained for five cents each, by addressing the "Commissioner of Patents, Washington, D. C."